US012543082B2

(12) United States Patent
Mattam et al.

(10) Patent No.: US 12,543,082 B2
(45) Date of Patent: Feb. 3, 2026

(54) SYSTEMS AND METHODS TO MANAGE CELL RESELECTION BY A USER EQUIPMENT

(71) Applicant: Samsung Electronics Co., Ltd., Suwon-si (KR)

(72) Inventors: Jajohn Mathew Mattam, Bangalore (IN); Manasi Ekkundi, Bangalore (IN); Arijit Sen, Bangalore (IN); Gaorav Kumar Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 18/309,290

(22) Filed: Apr. 28, 2023

(65) Prior Publication Data

US 2023/0370912 A1 Nov. 16, 2023

Related U.S. Application Data

(63) Continuation of application No. PCT/KR2023/005899, filed on Apr. 28, 2023.

(30) Foreign Application Priority Data

May 11, 2022 (IN) .............................. 202241027210
Mar. 25, 2023 (IN) ............................ 2022 41027210

(51) Int. Cl.
*H04W 36/00* (2009.01)
*H04W 84/04* (2009.01)

(52) U.S. Cl.
CPC ...... *H04W 36/0072* (2013.01); *H04W 84/042* (2013.01)

(58) Field of Classification Search
CPC .................. H04W 36/0072; H04W 84/042
See application file for complete search history.

(56) References Cited

U.S. PATENT DOCUMENTS 11,800,441 B2 * 10/2023 Wang .................... H04W 48/08
2011/0263252 A1 10/2011 Saini et al.
(Continued)

FOREIGN PATENT DOCUMENTS

| WO | 2015/187288 A1 | 12/2015 |
| WO | 2020/140830 A1 | 7/2020 |
| WO | 2021/045598 A1 | 3/2021 |

OTHER PUBLICATIONS

Samsung, Cell reselection with distance threshold, R2-2205533, 3GPP TSG-RAN WG2 Meeting #118 Electronic, Online, Apr. 25, 2022.
(Continued)

*Primary Examiner* — Asad M Nawaz
*Assistant Examiner* — Hugh Mark Ashely
(74) *Attorney, Agent, or Firm* — Jefferson IP Law, LLP

(57) ABSTRACT

A method for managing cell reselection by a user equipment (UE) is provided. The method includes storing, at the UE, a set of allowed frequency bands supported by a first operator. The set of allowed frequency bands are determined based on a first set of frequency bands supported by the first operator, and a second set of frequency bands associated with a second operator and permitted for use by the first operator. The method includes decoding a first system information block (SIB) comprising frequency information and frequency band information associated with corresponding neighbouring cells. The method includes determining one or more relevant neighbouring cells based on the corresponding first SIB and the set of allowed frequency bands, and further, determining, based at least on cell measurements associated with the one or more relevant neighbouring cells, at least one of a neighbouring cell for reselection.

15 Claims, 12 Drawing Sheets

(56) References Cited

U.S. PATENT DOCUMENTS

| | | |
|---|---|---|
| 2011/0300866 A1 | 12/2011 | Ali et al. |
| 2015/0327141 A1 | 11/2015 | Jung et al. |
| 2017/0251445 A1 | 8/2017 | Du et al. |
| 2018/0184309 A1* | 6/2018 | Bhardwaj ............ H04W 72/542 |
| 2020/0077325 A1 | 3/2020 | Jangid et al. |
| 2020/0154302 A1 | 5/2020 | Chen et al. |
| 2021/0235347 A1 | 7/2021 | Fujishiro et al. |
| 2021/0266801 A1 | 8/2021 | Shah et al. |
| 2022/0110038 A1 | 4/2022 | Shih et al. |

OTHER PUBLICATIONS

CATT, Further Discussion on Cell Reselection, R2-2205405, 3GPP TSG-RAN WG2 Meeting #118-e, Electronic, Apr. 25, 2022.
International Search Report dated Jul. 18, 2023, issued in International Application No. PCT/KR2023/005899.
CATT, Further Discussion on Cell Reselection, R2-2205236, 3GPP TSG-RAN WG2 Meeting #118-e, XP 52138805 A, Apr. 25, 2022.
Nokia Siemens Networks, Nas States, Persistent Scheduling, C-RNTI Allocation at Handover, R2-081372, 3GPP TSG-RAN2 Meeting #61, XP 50139100 A, Feb. 22, 2008, Sorrento, Italy.
European Search Report dated Mar. 31, 2025, issued in European Application No. 23803736.0.
Ericsson, Cell Selection and Cell Reselection Criteria, TSGR2#6(99)808, TSG-RAN Working Group 2 (Radio layer 2 and Radio layer 3), Aug. 16, 1999.
Indian Office Action dated Dec. 9, 2025, issued in Indian Patent Application No. 202241027210.

* cited by examiner

SYSTEMS AND METHODS TO MANAGE CELL RESELECTION BY A USER EQUIPMENT

CROSS-REFERENCE TO RELATED APPLICATION(S)

This application is a continuation application, claiming priority under § 365(c), of an International application No. PCT/KR2023/005899, filed on Apr. 28, 2023, which is based on and claims the benefit of an Indian Provisional patent application number 202241027210, filed on May 11, 2022, in the Indian Patent Office, and of an Indian Complete patent application number 202241027210, filed on Mar. 25, 2023, in the Indian Patent Office, the disclosure of each of which is incorporated by reference herein in its entirety.

BACKGROUND

1. Field

The disclosure relates to wireless communication systems. More specifically, the disclosure relates to systems and methods to manage reselection of cells by a user equipment (UE).

2. Description of Related Art

In wireless communication networks, user devices associated with users may initiate reselection when moving from one cell to another cell. The user devices may be associated with respective network operators. The user devices are further associated with a subscriber identification module (SIM) of the respective network operator and may support certain specific bands. As an example, one user device having a SIM of a first operator may support only those frequency bands supported by the first operator. Further, another user device having a SIM of a second operator may support frequency bands supported by the second operator as well as the first operator.

The user may initially be present in a first network of the first operator and may be moving to a second network of the second operator. The first network may be a home network for the user device, in that, the user device may be associated with a SIM for the first network. The second network may be a roaming network for the user device. When moving from the home network to the roaming network, the user device may perform cell reselection to connect to a cell of the second operator.

In some cases, the first network may have a network set-up for a particular radio access technology (RAT) while the second network may have a network set-up for a different RAT and/or the same RAT. As an example, the first network may have a network set-up for new radio standalone (NR SA) and may support only NR SA while the second network may have a network set-up for both long term evolution (LTE), non-standalone (NSA), and NR SA. The first network may have a roaming agreement with the second network in which the first network may use one or more set-up of the second network. For instance, the first network may have a roaming agreement with the second network to share the LTE and NSA set-up of the second network, however, not the NR SA set-up of the second network.

FIG. 1A illustrates a process for cell reselection, according to the related art.

Referring to FIG. 1A, in techniques of the related art, such as process 100, the UE may receive a system information block (SIB) from the network and decode the SIB to identify all the neighboring cells. The UE may measure all the neighboring cells if the frequency bands of the cells are supported by the UE. In some cases, the UE may trigger reselection to a neighboring cell, however, the reselection may be rejected as the neighboring cell may be associated with a network operator for which the UE may not have permissions for reselect.

In some examples, the UE may perform measurements of cells that belonging to non-target networks, i.e., networks that may have frequency bands not supported by the UE or networks for which the UE may not have permissions to connect to. In some examples, the UE may trigger reselection to a cell that does not belong to a target network, and the UE may face reselection rejection.

In some examples, the UE may be associated with a home operator and may trigger reselection to a cell of a different operator (roaming operator) for connecting to set-up of a specific RAT. The home operator may have an agreement with the roaming operator to use a different RAT. The reselection may pass however the registration of the UE to the network may fail as there is no agreement to use the specific RAT. This may result in delay in reselection procedures due to unnecessary failed resection and registration attempts.

FIG. 1B illustrates a diagram 110 depicting a user equipment (UE) measuring new radio (NR) SA cells of a first operator, according to the related art.

Referring to FIG. 1B, the UE may be referred as UE 2 and the first operator may be referred as an operator 1. The UE 2 is in cell 1 where network may broadcast details of a cell 2 and a cell 3 (both having higher priority than serving cell). The UE 2 may start measuring both the cells. When the UE 2 moves from the cell 1 to an overlapping area of the cell 2 and the cell 3, it may detect both cells. The cell 3 may have stronger signal conditions as the device is closer to the cell center of the cell 3. The UE 2 may trigger the reselection to the cell 3.

FIG. 1C illustrates a diagram 120 depicting a UE measuring NR SA cells of a second operator, according to the related art.

Referring to FIG. 1C, the UE may be referred as UE 3 and the second operator may be referred as an operator 2. The UE 3 is in cell 1 where NW may broadcast details of a cell 2 and a cell 3 (both having higher priority than serving cell). The UE 3 may start measuring both the cells. When the UE 3 moves from the cell 1 to an overlapping area of the cell 2 and the cell 3, it may detect both cells. The cell 2 may have stronger signal conditions as the device is closer to the cell center of the cell 2. The UE 3 may trigger the reselection to the cell 2.

When an operator is deploying NR SA or 5G only network, the operator is forced to have roaming agreements with other operators to take care of the customer needs. For seamless movement from the roaming network to home network, a roaming partner may include the 5G cell details in system information block 24 (SIB24). Further, the home network may include the public land mobile network (PLMN) of roaming network as an equivalent PLMN (EPLMN). Some cases in which the device may move from home to roaming network may include when the home network does not have enough coverage and/or for EPS fall back for VoLTE call (or for call continuity from voice over new radio (VoNR) to voice over long term evolution (VoLTE)).

In such a scenario, the home network may support only NR SA while the roaming network may have to be a network with which the home network has agreement to share LTE and not stand alone (NSA) NW. The roaming network may have the NR SA deployed, however, there may be no agreement to share NR SA resources. In use, the first operator includes the PLMNs of second operator in EPLMN/operator PLMN (OPLMN) list while the second operator includes NR SA cell information in SIB 24 of first operator. In case of OPLMN, the device may not be able to reselect from home network to roaming network, which results in loss of coverage outside the home network. Further, there may be unnecessary delay in measurements due to additional frequencies that may be present in the system information block. The user may not get service from the time of triggering reselection till the time of being back to the serving call or a new call.

Thus, the UE may face service issues such as loss of service, emergency service only, being stuck in a low priority RAT, and the like. For example, in known methods, reselection criteria may be checked however the roaming agreement is skipped. If the reselection criteria is met, reselection is triggered, however, the device may get rejected by the network and cannot receive any further services until reset or expiration of an internal timer.

Accordingly, there is a need to overcome the drawbacks discussed above. For instance, there is a need for methods and systems that allow the UE to seamlessly reselect neighboring cells without facing interruptions or loss in service.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide systems and methods to manage reselection of cells by a user equipment (UE).

In accordance with an aspect of the disclosure, a method for managing cell reselection by a user equipment (UE) is provided. The method includes storing, at the UE, a set of allowed frequency bands supported by a first operator, wherein the set of allowed frequency bands are determined based on a first set of frequency bands supported by the first operator, and a second set of frequency bands associated with a second operator and permitted for use by the first operator, decoding a first system information block (SIB) that comprises frequency information and frequency band information associated with corresponding neighboring cells, determining one or more relevant neighboring cells based on the corresponding first SIB and the set of allowed frequency bands, and determining, based at least on cell measurements associated with the one or more relevant neighboring cells, at least one of a neighboring cell for reselection.

In accordance with another aspect of the disclosure, a method for managing cell reselection by a user equipment (UE) is provided. The method includes storing, at the UE, a set of allowed public land mobile network (PLMN) identifiers associated with a first operator, wherein the set of allowed PLMN identifiers is determined based on an agreement between the first operator and a second operator, identifying a plurality of neighboring cells by decoding a first system information block (SIB) from each of the plurality of neighboring cells, selecting a neighboring cell from the plurality of neighboring cells, and for each selected neighboring cell, receiving a second SIB associated with the selected neighboring cell, determining a PLMN identifier associated with the selected neighboring cell based on the second SIB, determining whether the determined PLMN identifier is an allowed PLMN identifier based on the stored set of allowed PLMN identifier, and upon determining that the PLMN identifier is an allowed PLMN identifier, determining the selected neighboring cell to be a relevant neighboring cell.

In accordance with another aspect of the disclosure, a method for managing cell reselection by a user equipment (UE) is provided. The method includes decoding a system information block (SIB) from each of a plurality of neighboring cells, the SIB comprising a PLMN identifier associated with the corresponding neighboring cell, determining one or more relevant neighboring cells from the plurality of neighboring cells based on the PLMN identifier within the received SIB, determining whether the one or more relevant neighboring cells meet a reselection criteria, and triggering reselection to at least one of the one or more relevant neighboring cells.

In accordance with another aspect of the disclosure, a system to manage cell reselection by a user equipment (UE) is provided. The system includes a processor configured to store, at the UE, a set of allowed frequency bands supported by a first operator, wherein the set of allowed frequency bands are determined based on a first set of frequency bands supported by the first operator, and a second set of frequency bands associated with a second operator and permitted for use by the first operator, decode a first system information block (SIB) that comprises frequency information and frequency band information associated with corresponding neighboring cells, determine one or more relevant neighboring cells based on the corresponding first SIB and the set of allowed frequency bands, and determine, based at least on cell measurements associated with the one or more relevant neighboring cells, at least one of a neighboring cell for reselection.

In accordance with another aspect of the disclosure, a system to manage cell reselection by a user equipment (UE) is provided. The system includes a processor configured to store, at the UE, a set of allowed public land mobile network (PLMN) identifiers associated with a first operator, wherein the set of allowed PLMN identifiers is determined based on an agreement between the first operator and a second operator, identify a plurality of neighboring cells by decoding a first system information block (SIB) from each of the plurality of neighboring cells, select a neighboring cell from the plurality of neighboring cells, and for each selected neighboring cell, receive a second SIB associated with the selected neighboring cell, determine a PLMN identifier associated with the selected neighboring cell based on the second SIB, determine whether the determined PLMN identifier is an allowed PLMN identifier based on the stored set of allowed PLMN identifier, and upon determining that the PLMN identifier is an allowed PLMN identifier, determine the selected neighboring cell to be a relevant neighboring cell In accordance with another aspect of the disclosure, a system to manage cell reselection by a user equipment (UE) is provided. The system includes a processor configured to decode a system information block (SIB) from each of a plurality of neighboring cells, wherein the SIB comprises a PLMN identifier associated with the corresponding neighboring cell, determine one or more relevant neighboring cells from the plurality of neighboring cells based on the PLMN identifier within the received SIB, determine whether the one or more relevant neighboring cells meet a reselection criteria, and trigger reselection to at least one of the one or more relevant neighboring cells.

The systems as described above may be associated with a user equipment (UE).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
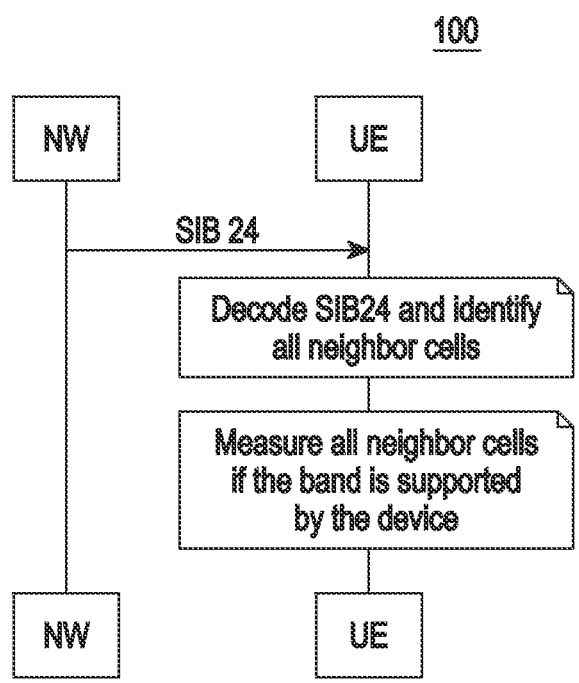
FIG. 1A illustrates a process for cell reselection, according to the related art.
Figure 1B:
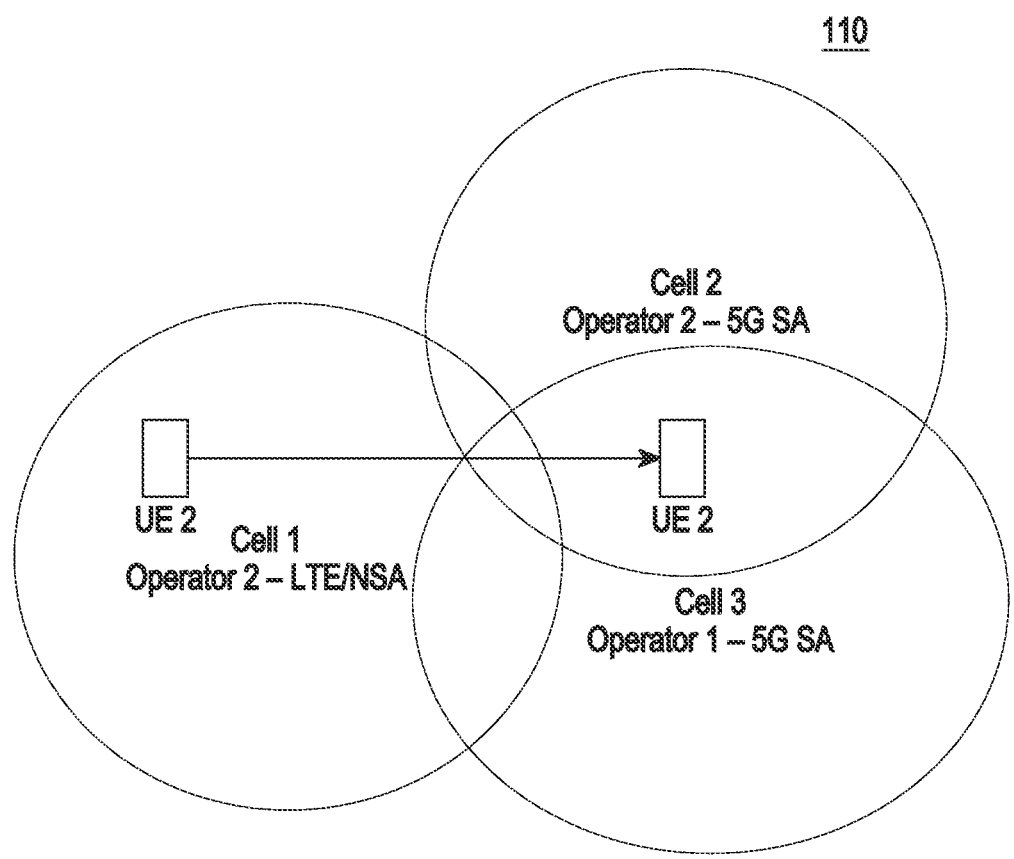
FIG. 1B illustrates a diagram depicting a UE measuring New Radio (NR) SA cells of a first operator, according to the related art.
Figure 1C:
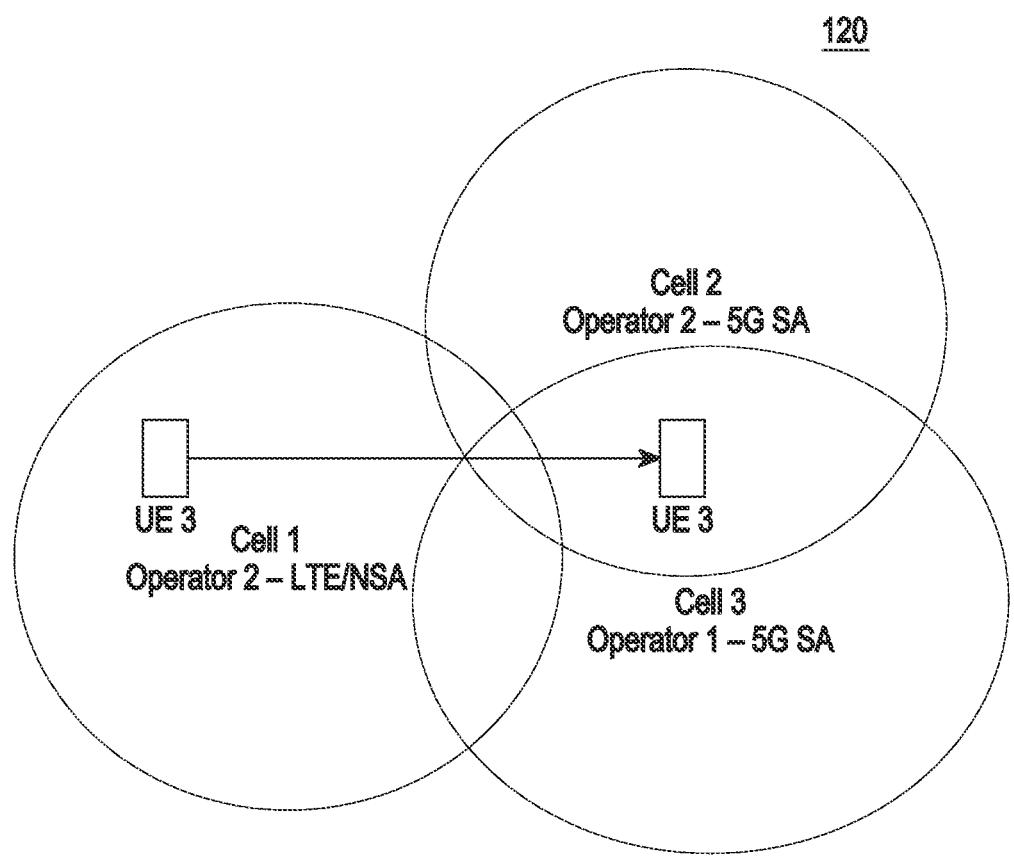
FIG. 1C illustrates a diagram depicting a UE measuring NR SA cells of a second operator, according to the related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The disclosure provides methods and systems for managing cell reselections by a user equipment (UE). The methods and the systems as described herein ensure that service to users is not affected when there is roaming agreements between different operators, such as, roaming agreements between different operators for a particular RAT. The methods and systems prevent the users from facing issues such as service interruptions, limited service, emergency service only, and the like. For example, in accordance with the disclosure, a roaming agreement is checked, and measurements are continued only if registration or roaming in particular network is allowed. If the reselection criteria are met, reselection is triggered, and there is no issue with the registration and the device may access all the services.

Figure 2:
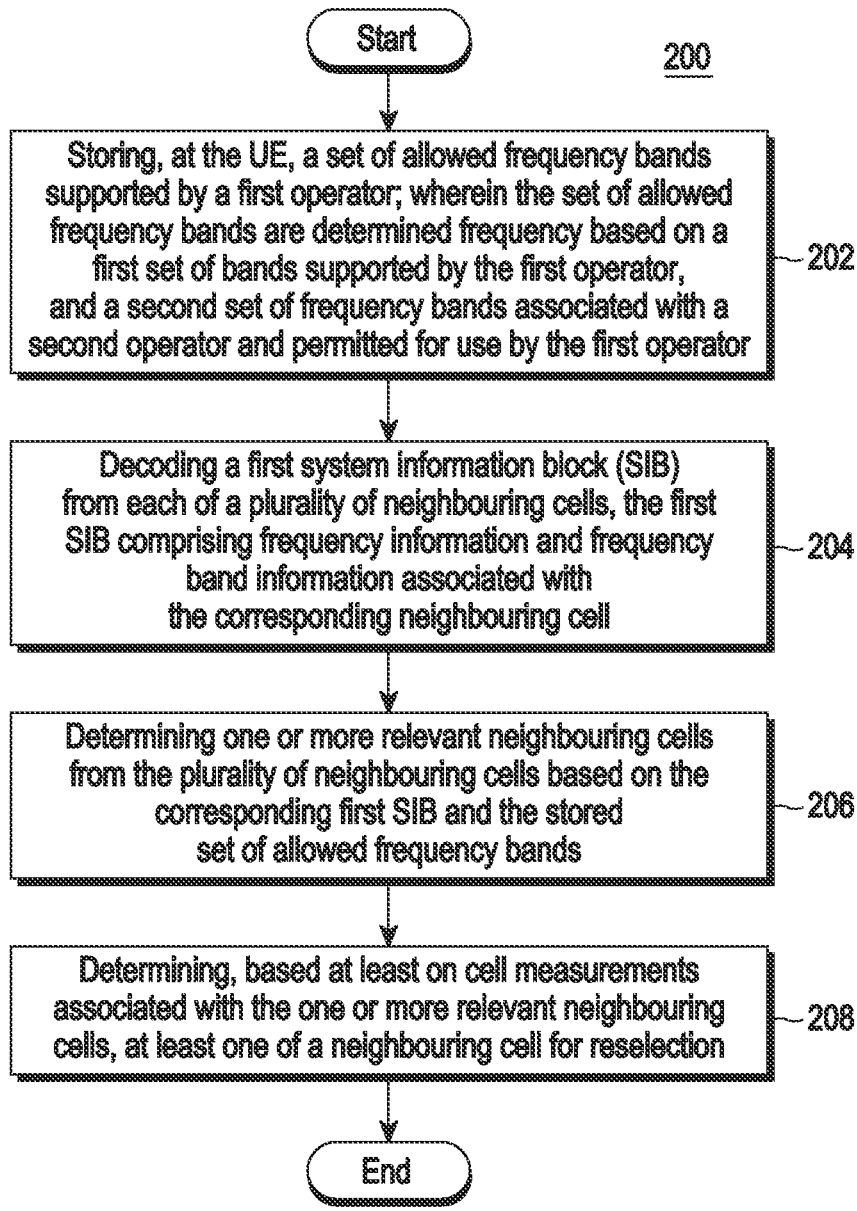
FIG. 2 illustrates a method for managing cell reselection by a user equipment (UE), according to an embodiment of the disclosure.

FIG. 2 illustrates a flowchart depicting a method 200 for managing cell reselection by a user equipment (UE), according to an embodiment of the disclosure. The method 200 may be performed by the UE.

Figure 9:
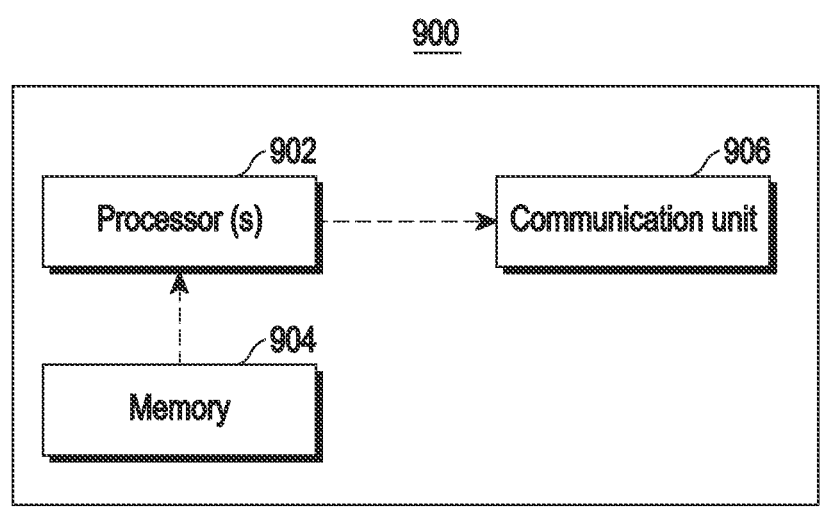
FIG. 9 illustrates configuration of a user equipment, according to an embodiment of the disclosure.

Referring to FIG. 2, the UE and its associated functions along with architecture is explained in conjunction with at least FIG. 9. The UE may include, but is not limited to, a mobile phone, a tablet, and any other electronic device which is capable of connecting to a fourth generation (4G) and/or fifth generation (5G) network.

The UE may be in communication with one or more network entities associated with different networks. The network entities and associated functions along with the corresponding architecture is explained in conjunction with at least FIG. 8. In some embodiments, the network entity may be a network node in a 5G network, such as a 5G core network (5GC). In some embodiments, the 5GC may include, but is not limited to, access and mobility function (AMF), session management function (SMF), etc.

The network entities may be associated with one or more network operators, such as a first operator and a second operator. The first operator may be associated with a one set of frequency bands, in that, the one of frequency bands may be supported by the first operator. Similarly, the second operator may be associated with another set of frequency bands that are supported by the second operator.

One of the first operator and the second operator may have a NR SA network set-up defining a first network. In some embodiments, another of the first operator and the second operator may have a NR SA, NSA, and LTE network set-up defining a second network. In some embodiments, one of the first operator and the second operator may have a roaming agreement with the other of the first operator and the second operator to share only the LTE network set-up.

The UE may be associated with one or more frequency bands, in that, the UE may support one or more frequency bands for communication operations. In some embodiments, the UE may have a SIM of the second operator and may support only the frequency bands supported by the second operator. In some embodiments, the UE may have a SIM of the second operator and may support the frequency bands supported by the second operator and the first operator. Alternatively, the UE may have SIM of the first operator and may support the frequency bands supported by the first operator and the second operator.

At operation 202, a set of allowed frequency bands supported by the first operator is stored at the UE. The set of allowed frequency bands may be determined based on a first set of frequency bands supported by the first operator and a second set of frequency bands supported by the second operator and permitted for use by the first operator. In some embodiments, the set of allowed frequency bands may be stored at a non-access stratum layer.

The set of allowed frequency bands may comprise frequency bands supported by the first operator as well as frequency bands supported by the second operator. For example, the first operator may have a roaming agreement with the second operator such that the second operator permits the first operator to use the second set of frequency bands of the second operator. In case the UE has the SIM of the first operator, the set of allowed frequency bands may comprise the first set of frequency bands supported by the first operator and the second set of frequency bands of the second operator that is permitted for use by the first operator based on the roaming agreement.

In another example, the second operator may not have the roaming agreement with the first operator to use the network set-up of the first operator. In case the UE has the SIM of the second operator, the set of allowed frequency bands may comprise the second set of frequency bands supported by the second operator, and further, any other frequency bands supported by the second operator.

At operation 204, a first system information block (SIB) is decoded from each of a plurality of neighboring cells. The first SIB may comprise frequency information and frequency band information associated with the corresponding neighboring cell. That is, the frequency information and frequency band information from each of the plurality of neighboring cells may be decoded by the UE.

The first SIB may comprise a system information block 24 (SIB 24) that may comprise information related to neighboring cells associated with NR SA network.

At operation 206, one or more relevant neighboring cells are determined from the plurality of neighboring cells based on the corresponding first SIB and the stored set of allowed frequency bands. The one or more relevant neighboring cells may be determined by selecting one or more cells from the plurality of neighboring cells that support one or more of the frequency bands from the set of allowed frequency bands. The one or more relevant neighboring cells may be determined by filtering the plurality of neighboring cells as per the first SIB associated with the plurality of neighboring cells, and further, as per the set of allowed frequency bands of the UE.

For example, the UE may have the SIM of the first operator and may have the set of allowed frequency bands comprising frequency bands supported by the first operator as well as the frequency bands of the second operator that are permitted to use by the first operator. Further, the UE may currently be in network of the second operator and looking to re-select to network of the first operator. In this example, from all the plurality of neighboring cells, one or more relevant cells associated with the frequency bands that form the set of allowed frequency bands are determined.

In another example, the UE may have the SIM of the second operator and may have the set of allowed frequency bands comprising frequency bands supported by the second operator only. Further, the UE may currently be in network of the second operator and looking to re-select to another cell. In this example, from all the plurality of neighboring cells, one or more relevant cells associated with the frequency bands that form the set of allowed frequency bands are determined, i.e., only the neighboring cells that are associated with the frequency bands supported by the second operator is determined.

Accordingly, the neighboring cells that are associated with frequency bands not forming a part of the set of allowed frequency bands are not considered by the UE for reselection. The UE may thus consider only the one or more relevant neighboring cells for reselection purposes.

In case the first operator has a roaming agreement with the second operator, and the UE has the SIM of the first operator, then a public land mobile network (PLMN) of the second operator may be saved at the UE as an equivalent public land mobile network (EPLMN), thus allowing the UE to make use of the network set-up of the second operator in accordance with the roaming agreements.

At operation 208, at least one of a neighboring cell is determined for the reselection based on at least one cell measurements associated with the one or more relevant neighboring cells. The UE may perform measurements on the one or more relevant neighboring cells in order to determine at least one of a neighboring cell for reselection. In some embodiments, the measurements may comprise measuring a signal strength associated with each of the one or more relevant neighboring cells. In some embodiments, the UE may measure reference signal received power (RSRP) and reference signal received quality (RSRQ) of each of the one or more relevant neighboring cells.

Accordingly, the UE performs measurements on only the relevant neighboring cells rather than all of the neighboring cells. The UE may then trigger reselection to the determined at least one of a neighboring cell, such as when the at least one of the neighboring cell meets the reselection criteria.

In some embodiments, the plurality of neighboring cells may be associated with overlapping frequency bands that are supported by both the first operator and the second operator. The overlapping frequency bands may form part of the first set of frequency bands as well as the second set of frequency bands. As the overlapping frequency bands may be associated with both the first operator and the second operator, the UE may determine whether an overlapping frequency band decoded in the first SIB is related to the first operator and the second operator. The UE may perform additional operations to associate the overlapping frequency band with one of the first operator and the second operator, and further, determine the one or more relevant neighboring cells based on the associated overlapping frequency band.

Figure 3A:
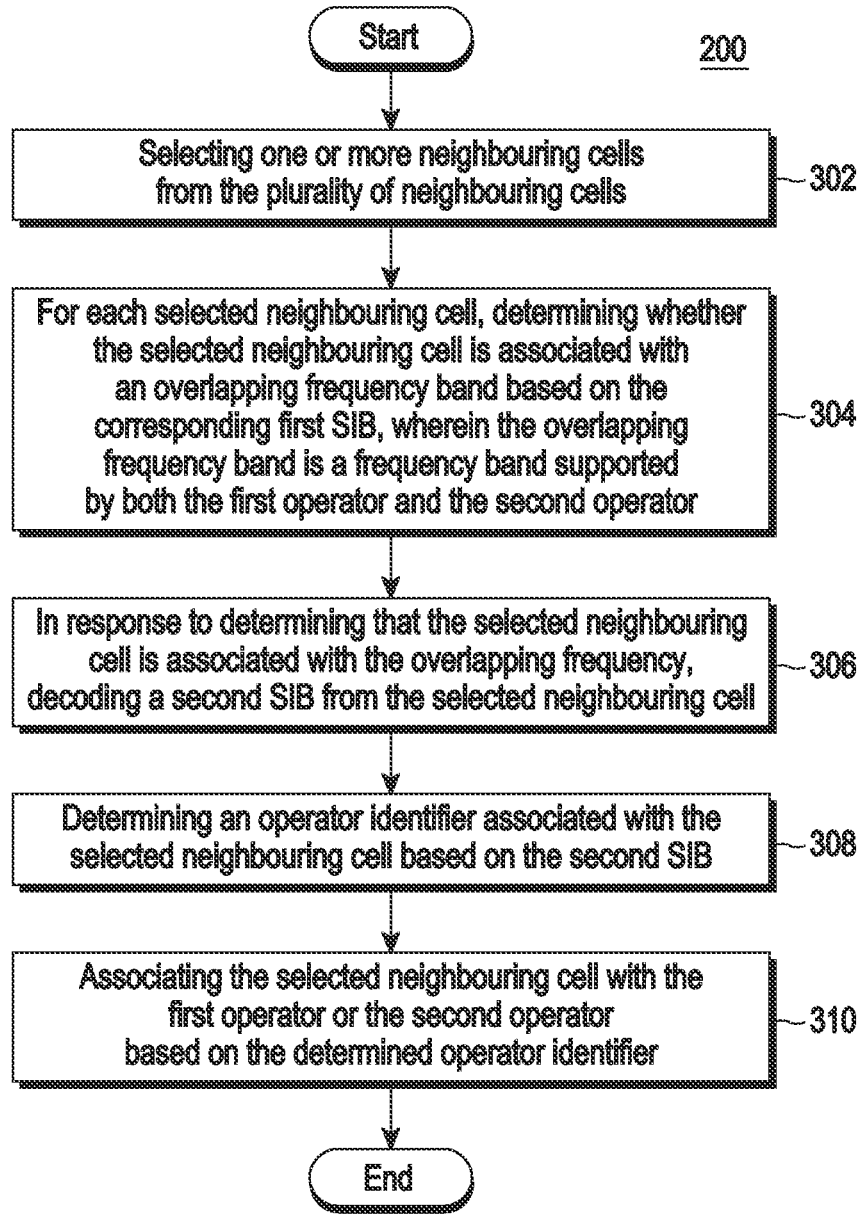
FIG. 3A illustrates a method for managing cell reselection by the UE, according to an embodiment of the disclosure.

According to an embodiment of the disclosure, to determine the one or more relevant neighboring cells, the method 200 may comprise sub-operations 302-310 as illustrated in FIG. 3A.

FIG. 3A illustrates a method for managing cell reselection by the UE, according to an embodiment of the disclosure.

Referring to FIG. 3A, at operation 302, the method 200 comprises selecting one or more neighboring cells from the plurality of neighboring cells.

At operation 304, for each selected neighboring cell, it may be determined whether the selected neighboring cell is associated with an overlapping frequency band based on the corresponding first SIB. The overlapping frequency band may be a frequency band supported by both the first operator and the second operator.

At operation 306, the second SIB is decoded from the selected neighboring cell in response to determining that the selected neighboring cell is associated with the overlapping frequency. The second SIB may comprise a system information block 1 (SIB 1) associated with the selected neighboring cell. The second SIB may comprise details associated with the selected neighboring cell, such as signaling radio bearer, logical channel, PLMN identity, cellIdentity, cellbarred, freqBandIndicator, intraFreqReselection, and the like.

At operation 308, an operator identifier associated with the selected neighboring cell is determined based on the second SIB. That is, the UE may determine whether the overlapping frequency belongs to the first operator or the second operator.

At operation 310, the selected neighboring cell is associated with the first operator or the second operator based on the determined operator identifier. As an example, in case the UE has the SIM associated with the first operator and the UE determines that the overlapping frequency band belongs to the first set of frequency bands, i.e., supported by the first operator, then the UE may associate the overlapping frequency band with the first operator and may determine the selected neighboring cell as a relevant neighboring cell. In another example, in case the UE has the SIM associated with the first operator and the UE determines that the overlapping frequency band belongs to a frequency band supported by the second operator but not permitted for use by the first operator, then the UE may associate the overlapping frequency band with the second operator and may not determine the selected neighboring cell as a relevant neighboring cell.

Figure 3B:
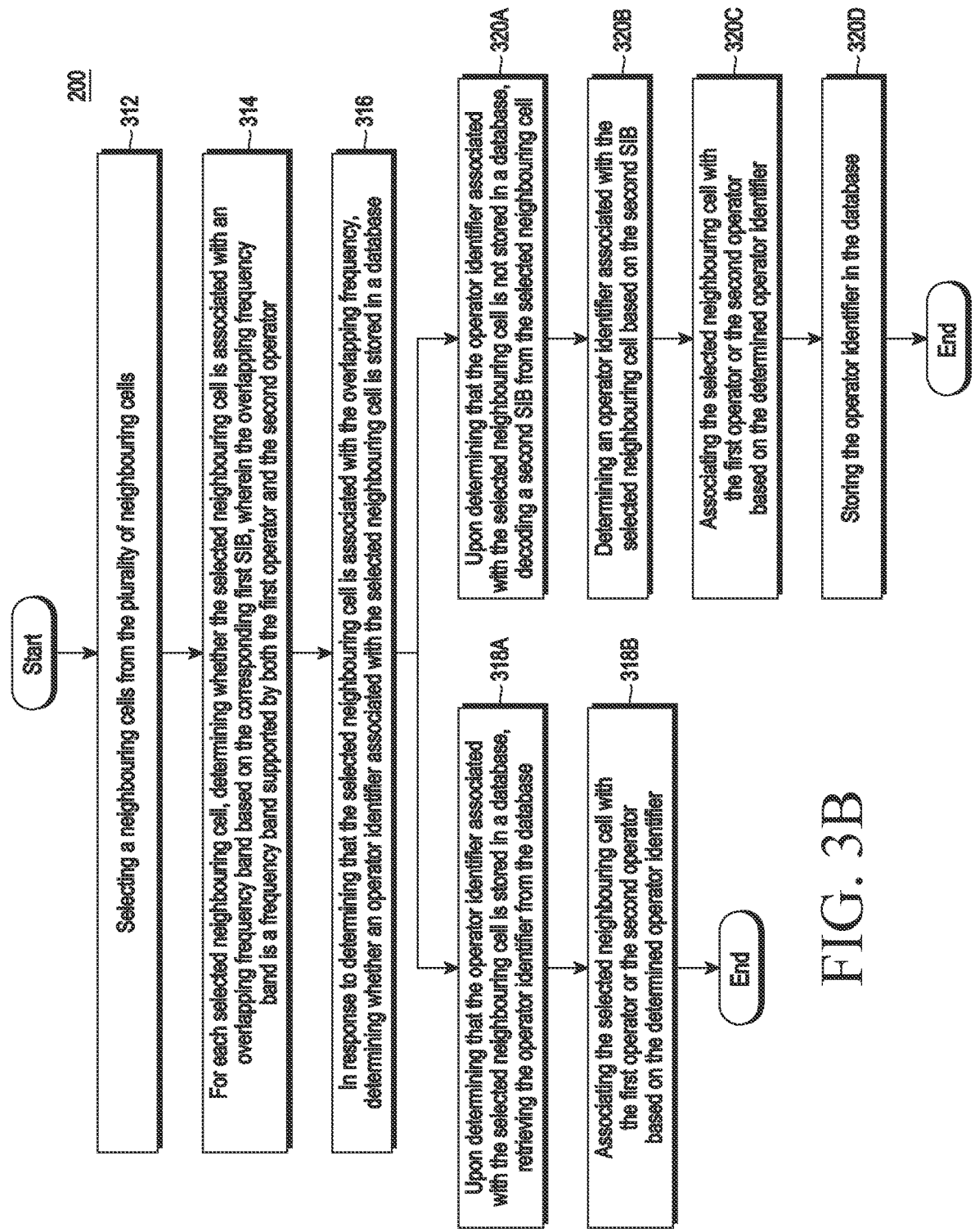
FIG. 3B illustrates a method for managing cell reselection by the UE, according to an embodiment of the disclosure.

According to an embodiment of the disclosure, to determine the one or more relevant neighboring cells, the method 200 may comprise sub-operations 312-320D as illustrated in FIG. 3B.

FIG. 3B illustrates a method for managing cell reselection by the UE, according to an embodiment of the disclosure.

Referring to FIG. 3B, at operation 312, the method 200 comprises selecting one or more neighboring cells from the plurality of neighboring cells.

At operation 314, for each selected neighboring cell, it may be determined whether the selected neighboring cell is associated with the overlapping frequency band based on the corresponding first SIB. The overlapping frequency band may be a frequency band supported by both the first operator and the second operator.

At operation 316, the UE may determine, in response to determining that the selected neighboring cell is associated with the overlapping frequency, whether the operator identifier associated with the selected neighboring cell is stored in a database. In some embodiments, the operator identifier may comprise a public land mobile network (PLMN) identifier.

In case it is determined that the operator identifier is stored in the database, at operation 318A, the operator identifier is retrieved from the database and at operation 318B, the selected neighboring cell is associated with the first operator or the second operator based on the determined operator identifier. Accordingly, the UE may initiate or continue measurements for the reselection based on whether the overlapping frequency band belongs to the first operator or the second operator. As an example, in case the UE has the SIM of the first operator and the overlapping frequency band belongs to the first set of frequency bands, the UE may associate the selected neighboring cell with the first operator and may determine the selected neighboring cell to be a relevant neighboring cell.

In case it is determined that the operator identifier is not stored in the database, at operation 320A, the second SIB from the selected neighboring cell is decoded. The second SIB may comprise system information block 1 (SIB 1) associated with the selected neighboring cell. At operation 320B, the operator identifier associated with the selected neighboring cell is determined based on the second SIB. That is, the UE may determine whether the overlapping frequency belongs to the first operator or the second operator. At operation 320C, the selected neighboring cell is associated with the first operator or the second operator based on the determined operator identifier. At operation 320D, the operator identifier may be stored in the database, such as, for future reference during the reselection procedures.

Figure 4:
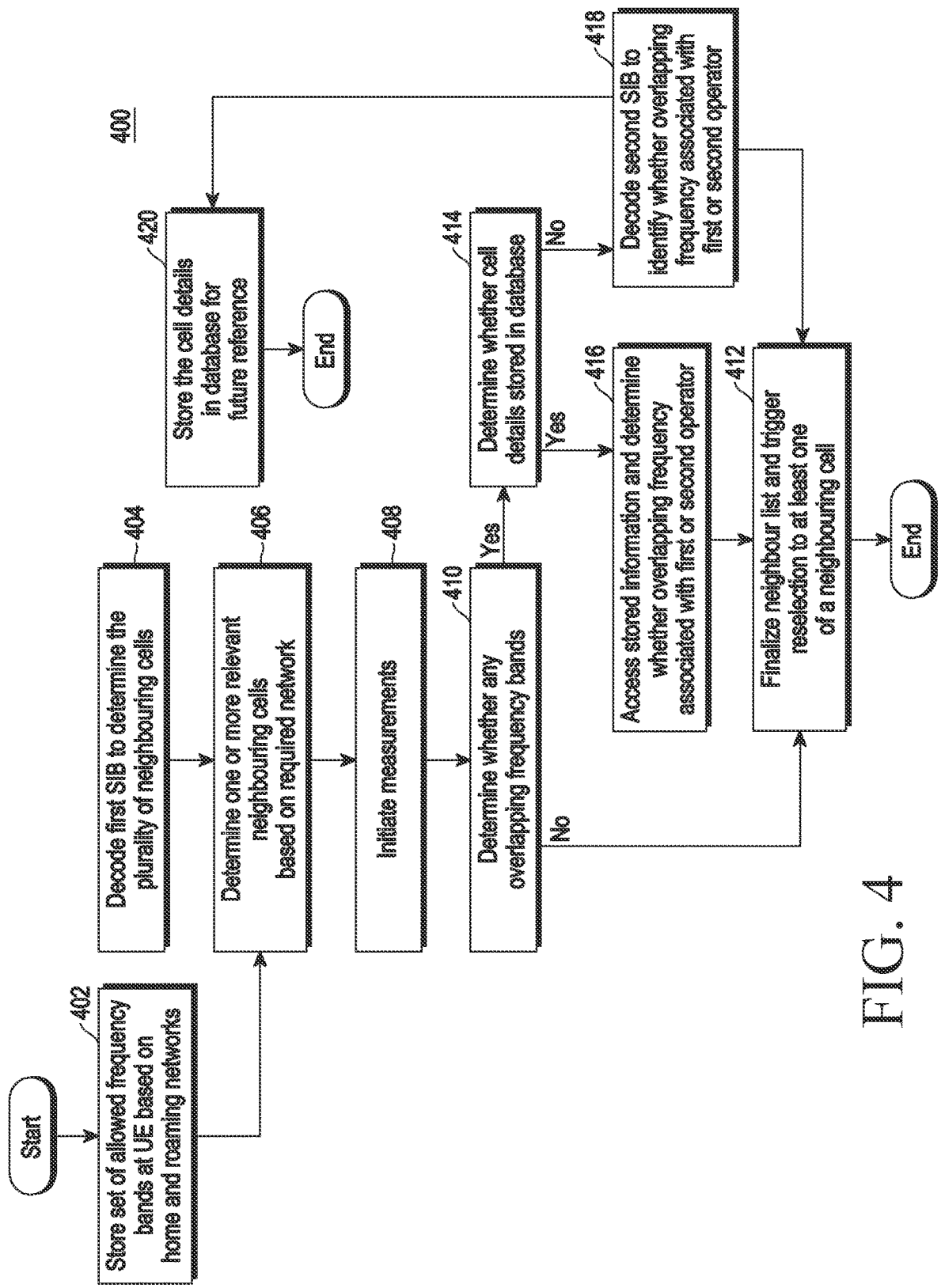
FIG. 4 illustrates a process flow for managing cell reselection by the UE, according to an embodiment of the disclosure.

FIG. 4 illustrates a process flow 400 for managing cell reselection by the UE, according to an embodiment of the disclosure.

Referring to FIG. 4, at operation 402, the set of allowed frequency bands are stored at the UE based on the home and the roaming network. In case of the UE having the SIM of the first operator, the set of allowed frequency bands may comprise the first set of frequency bands supported by the first operator and the second set of frequency bands supported by the second operator and permitted for use by the first operator.

At operation 404, the first SIB is decoded by the UE in order to determine the plurality of neighboring cells. The first SIB may comprise frequency information and frequency band information of the corresponding neighboring cells. For instance, the first SIB may be SIB24 comprising information related to neighboring cells associated with NR SA network.

At operation 406, based on the stored set of allowed bands, one or more relevant neighboring cells are determined from the plurality of neighboring cells. For instance, the one or more relevant neighboring cells may be determined by filtering the plurality of neighboring cells based on the first SIB associated with the plurality of neighboring cells and the set of allowed frequency bands of the UE. The one or more relevant neighboring cells may be determined by checking the stored set of allowed bands. For instance, in case the UE has the SIM of the second operator, the UE is present in the second network, and the second operator does not have the roaming agreement with the first operator, the set of allowed frequency bands may comprise only the frequency bands supported by the second operator. Accordingly, the one or more relevant neighboring cells for the UE may be determined as those cells that are associated with the frequency bands supported by the second operator.

At operation 408, the UE may initiate measurements of the one or more relevant neighboring cells. For instance, the UE may initiate measurements of signal power of each of the one or more relevant neighboring cells. At operation 410, the UE may determine whether any overlapping frequency bands is being measured. As described above, the overlapping frequency bands may be associated with both the first operator and the second operator, and the UE may need to associate the overlapping frequencies with one of the first operator and the second operator.

At operation 412, in case overlapping frequency bands are not identified, a finalized neighbor list is determined based on the one or more relevant neighboring cells, such as the neighboring cells that meet the requirements for measurements and reselection criteria. Further, the reselection may then be triggered to at least one of a neighboring cell that is determined for reselection.

At operation 414, in case the overlapping frequency bands are identified, the UE may check whether cell details of the neighboring cell associated with the overlapping frequency bands are stored in the database. If the cell details are stored in the database, then at operation 416, the UE may access the stored cell information in order to determine whether the overlapping frequency bands being detected are associated with the first operator or the second operator. Accordingly, the UE may determine whether to continue the measurements of the neighboring cells having the overlapping frequency bands or not. The process may then move to operation 412 where the neighbor list is finalized and at least one of the neighboring cell is determined for reselection.

In case the UE has the SIM of the second operator, the UE is present in the second network, and the second operator does not have the roaming agreement with the first operator, the UE may determine that the neighboring cell having the overlapping frequency is associated with the first operator, and may not continue measurements of that particular neighboring cell. Alternatively, in case the UE determines that the neighboring cell having the overlapping frequency is associated with the second operator, the UE may continue measurements of that particular neighboring cell.

If the cell details are not stored in the database, then at operation 418, the second SIB is decoded from the corresponding neighboring cells having the overlapping frequency. In some embodiments, the second SIB may comprise a system information block 1 (SIB 1) associated with the corresponding neighboring cells. Based on the second SIB, the cell details are determined and the UE associates the neighboring cells with one of the first operator and the second operator. The process may then move to operation 412 where the neighbor list is finalized and at least one of a neighboring cell is determined for reselection.

At operation 420, the decoded cell details may be stored in the database. The decoded cell details may be accessed from the database by the UE, for instance, at a next process where the overlapping frequencies may be detected by the UE during future reselection procedures. In some embodiments, a validity of the stored cell details may be controlled using an implementation specific timer.

Accordingly, the UE measures only the relevant neighboring cells for the reselection purposes and further, the UE may trigger reselection to at least one of the neighboring cell that has been finalized based on the allowed frequency bands, the first SIB, and any overlapping frequency bands. Thus, the reselection procedures would be without any hinderances as the UE would not face rejections during reselections since the reselection is triggered only for the finalized neighboring cells, and not for any of the neighboring cells. The service quality of maintained and there is no loss of signal or service for the UE.

Figure 5:
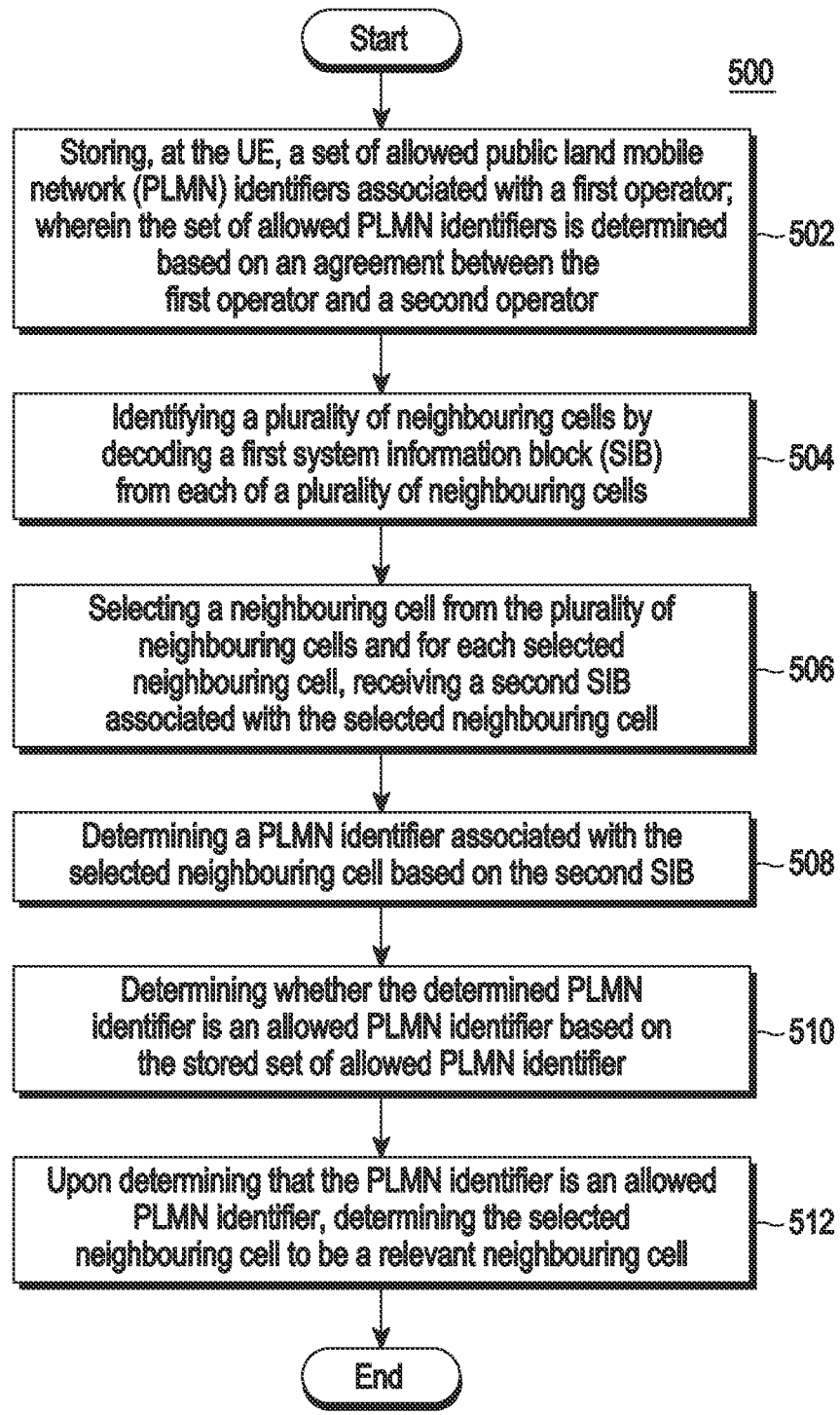
FIG. 5 illustrates a method for managing cell reselection by the UE, according to an embodiment of the disclosure.

FIG. 5 illustrates a method 500 for managing cell reselection by the UE, according to an embodiment of the disclosure. The method 500 may be performed by the UE.

Referring to FIG. 5, at operation 502, a set of allowed public land mobile network (PLMN) identifiers is stored at the UE. The set of allowed PLMN identifiers may be stored at the NAS layer. The set of allowed PLMN identifiers may be accessed by the radio resource control (RRC) layer during reselection procedures.

The set of allowed PLMN identifiers may be determined based on the roaming agreements between the first operator and the second operator. For instance, the first operator may have the roaming agreement with the second operator to share the network set-up of the second operator. Accordingly, for the UE having the SIM of the first operator, the set of allowed PLMN identifiers may comprise the PLMN identifier of the first operator as well as the second operator. Further, for the UE having the SIM of the second operator, the set of allowed PLMN identifiers may comprise the PLMN identifier of only the second operator as there is no roaming agreement for the second operator to use the network set-up of the first operator.

At operation 504, a plurality of neighboring cells is identified by the UE based on first system information block (SIB) of the plurality of neighboring cells. The UE may decode the first SIB from the plurality of neighboring cells. The first SIB may comprise SIB24 having details of NR SA neighboring cells. The method may comprise measuring the plurality of neighboring cells to determine whether the plurality of neighboring cells meets certain measurement related parameters, such as, signal power.

At operation 506, the UE may select the neighboring cell from the plurality of neighboring cells and receive the second SIB for the selected neighboring cell. In some embodiments, the second SIB may the comprise SIB1 having cell information details of the selected neighboring cell. At operation 508, a PLMN identifier of the selected neighboring cell may be determined by the UE based on the second SIB. At operation 510, the UE may determine whether the determined PLMN identifier is an allowed PLMN identifier based on the stored set of allowed PLMN identifiers. At operation 512, the UE may determine the selected neighboring cell to be a relevant neighboring cell in case the PLMN identifier of the selected neighboring cell belongs to the stored set of PLMN identifiers.

The UE may repeat the operations 506-512 for each of the plurality of neighboring cells. Once the relevant neighboring cells are determined, the UE may trigger the reselection to at least one of the neighboring cells based on certain measurement requirements and reselection criteria. In case one or more neighboring cells are not considered as relevant, in that the one or more neighboring cells are associated with PLMN identifiers not included in the set of allowed PLMN identifiers, the UE may skip further measurements of the one or more neighboring cells.

The method 500 may further comprise determining whether the relevant neighboring cell meets a predefined reselection criteria. Upon determining that the relevant neighboring cell meets the predefined reselection criteria, the UE may trigger reselection to the relevant neighboring cell.

The method 500 may further comprise, prior to receiving and decoding the second SIB from the selected neighboring cell from the plurality of neighboring cells as described above, determining whether the selected neighboring cell meets the predefined reselection criteria. In case the selected neighboring cell meets the predefined reselection criteria, the UE may proceed to decode the second SIB of the selected neighboring cell to determine the PLMN identifier. Further, in case the determined PLMN identifier of the selected neighboring cell belongs to the stored set of allowed PLMN identifiers, the UE may trigger reselection to the selected neighboring cell. In case the determined PLMN identifier of the selected neighboring cell does not belong to the stored set of allowed PLMN identifiers, the UE may skip or stop measuring the selected neighboring cell and may proceed to measure other neighboring cells.

Figure 6A:
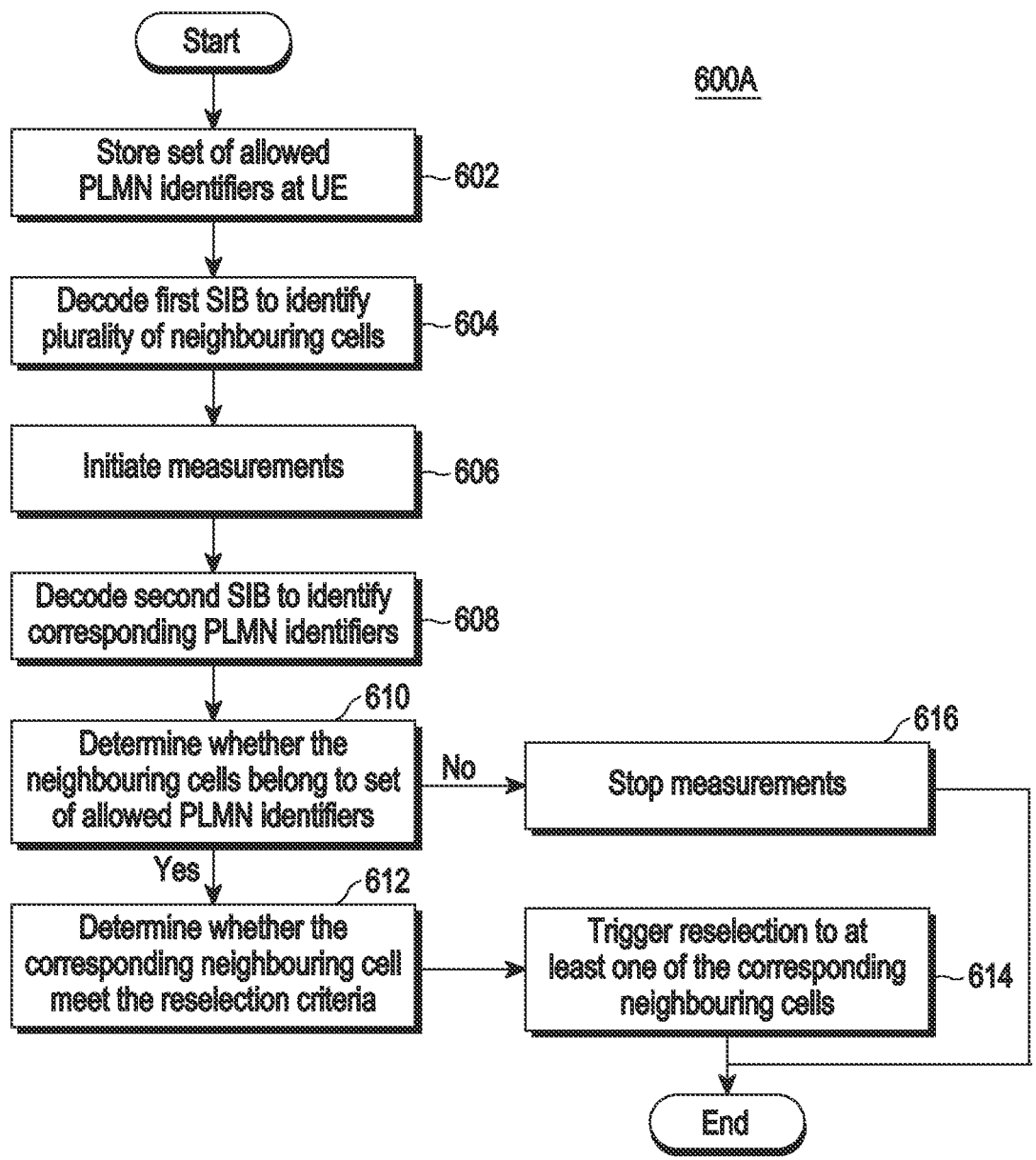
FIG. 6A illustrates a process flow for managing cell reselection by the UE, according to an embodiment of the disclosure.

FIG. 6A illustrates a process flow 600A for managing cell reselection by the UE, according to an embodiment of the disclosure.

Referring to FIG. 6A, at operation 602, the set of allowed PLMN identifiers is stored at the UE. The NAS layer may maintain the set of allowed PLMN identifiers. As described above, the set of allowed PLMN identifiers may be determined based on the agreements between the first operator and the second operator. For instance, the set of allowed PLMN identifiers may comprise list of PLMNs that are allowed for registration. In some embodiments, the set of allowed PLMN identifiers is shared with RRC.

At operation 604, the first SIB may be decoded by the UE to identify the plurality of neighboring cells. At operation 606, the UE may initiate measurements of the plurality of neighboring cells. For instance, the UE may measure the RSRP and RSRQ parameters of the plurality of neighboring cells.

At operation 608, the UE may decode the second SIB from the plurality of neighboring cells to identify the corresponding PLMN identifiers. In some embodiments, the UE may decode the second SIB from only the plurality of neighboring cells that have measurement values, such as signal power values, greater than a set threshold.

At operation 610, the UE may determine whether the neighboring cells having corresponding PLMN identifiers belong to the set of allowed PLMN identifiers. If one or more of the corresponding PLMN identifiers belong to the set of allowed PLMN identifiers, then at operation 612, the UE may determine whether the corresponding neighboring cells meet predefined reselection criteria. At operation 614, the UE may trigger reselection to at least one of the corresponding neighboring cells that meets the reselection criteria. In some embodiments, the RRC may check the reselection criteria as defined in third generation partnership project (3GPP) specification and should check if PLMN is included in the set of allowed PLMN identifiers. Further, for one or more of the neighboring cells having the corresponding PLMN identifiers that do not belong to the set of allowed PLMN identifiers, at operation 616, the UE may stop measurements of such neighboring cells having the corresponding PLMN identifiers that do not belong to the set of allowed PLMN identifiers.

Figure 6B:
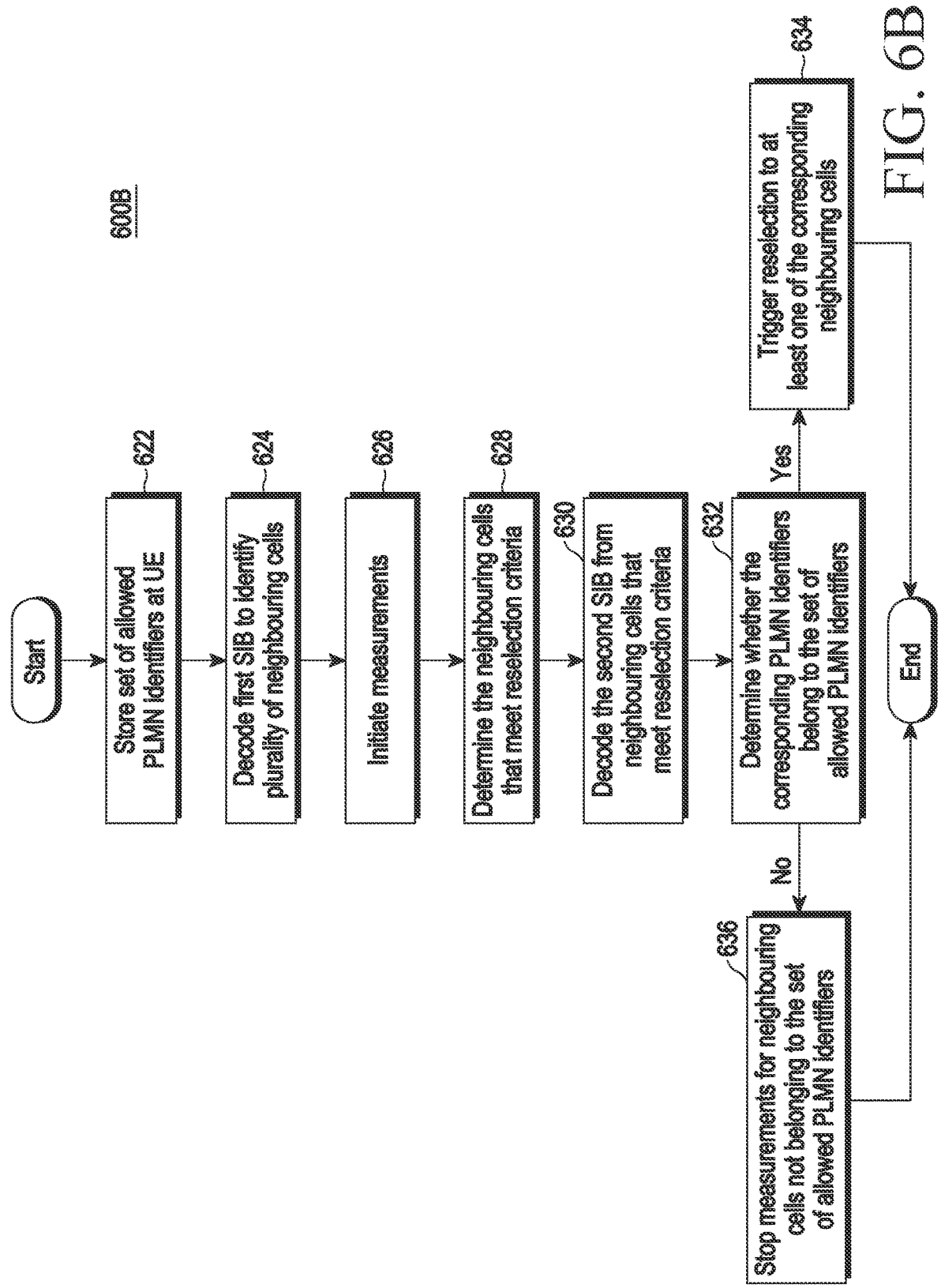
FIG. 6B illustrates a process flow for managing cell reselection by the UE, according to an embodiment of the disclosure.

FIG. 6B illustrates a process flow for managing cell reselection by the UE, according to an embodiment of the disclosure.

Referring to FIG. 6B, at operation 622, the set of allowed PLMN identifiers is stored at the UE. As described above, the set of allowed PLMN identifiers may be determined based on the roaming agreements between the first operator and the second operator.

At operation 624, the first SIB may be decoded by the UE to identify the plurality of neighboring cells. At operation 626, the UE may initiate measurements of the plurality of neighboring cells. For instance, the UE may measure the RSRP and RSRQ parameters of the plurality of neighboring cells.

At operation 628, the UE may determine the neighboring cells that meet the predefined reselection criteria. At operation 630, the UE may decode the second SIB from the neighboring cells that meet the reselection criteria in order to identify the corresponding PLMN identifiers.

At operation 632, the UE may determine whether the corresponding PLMN identifiers belong to the set of allowed PLMN identifiers. At block 634, the UE may trigger reselection to at least one of the neighboring cell having corresponding PLMN identifiers belonging to the set of allowed PLMN identifiers and that meets the reselection criteria. For the neighboring cells having the corresponding PLMN identifiers that do not belong to the set of allowed PLMN identifiers, at operation 636, the UE may stop measurements of such neighboring cells having the corresponding PLMN identifiers that do not belong to the set of allowed PLMN identifiers.

Accordingly, the UE may trigger reselection only to relevant neighboring cells based on the set of allowed PLMN identifiers. Thus, there is no risk of receiving reselection rejection as the reselection would be triggered to only those cells that would accept the reselection.

Figure 7:
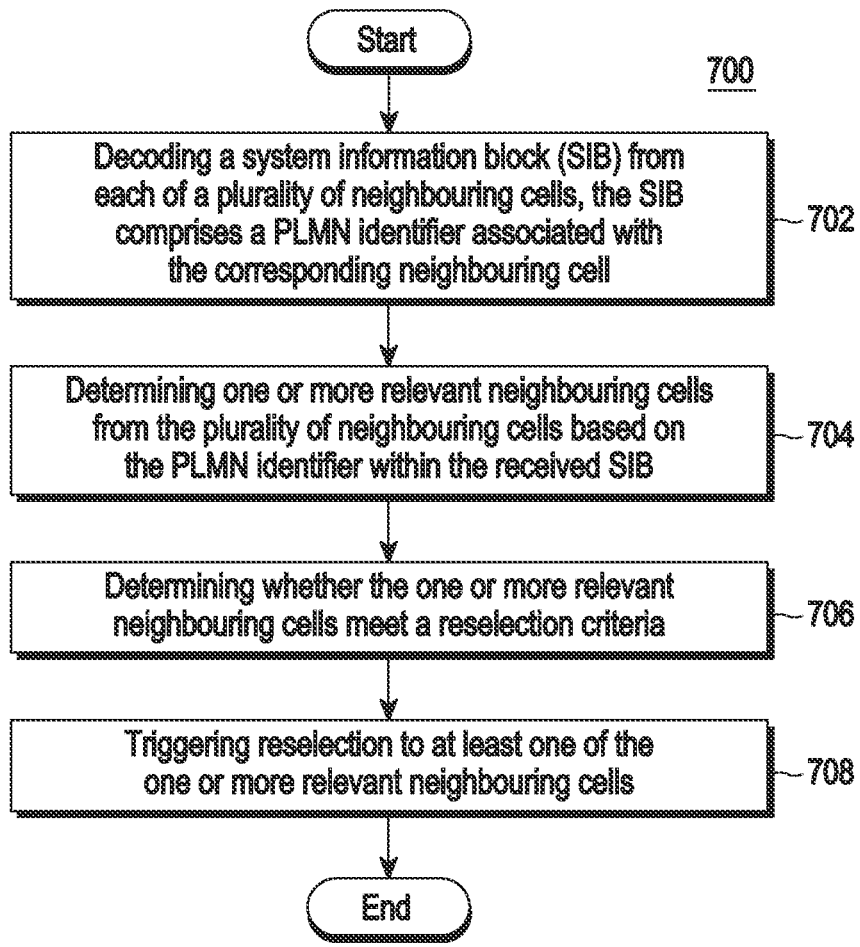
FIG. 7 illustrates a method for managing cell reselection by the UE, according to an embodiment of the disclosure.

FIG. 7 illustrates a method 700 for managing cell reselection by the UE, according to an embodiment of the disclosure. The method 700 may be performed by the UE.

At operation 702, the UE may decode system information block (SIB) from each of a plurality of neighboring cells. In some embodiments, the SIB may be SIB24 comprising details of neighboring cells that support NR SA networks.

The SIB comprises a PLMN identifier associated with the corresponding neighboring cells of the plurality of neighboring cells. In some embodiments, the PLMN identifier may be added as an additional information element (IE) within the SIB. For instance, the PLMN identifier may be added as an additional IE in CarrierFreqNR. As an example, the following details may be added in the SIB:

CarrierFreqNR-vxxxx::=SEQUENCE {
Plmn-Identity-rxx PLMN-Identity OPTIONAL,
}

At operation 704, the UE may determine one or more relevant neighboring cells from the plurality of neighboring cells based on the PLMN identifier within the received SIB. Accordingly, the UE may be enabled to differentiate a neighboring cell with respect to the operators and the networks based on the SIB being received from the neighboring cells. The UE may thus consider only the cells that belong to the required network, such as, UE having SIM of first operator may consider cells belonging to the first operator.

At operation 706, the UE may determine whether the one or more relevant neighboring cells meet predefined reselection criteria. Further, at operation 708, the UE may trigger reselection to at least one of the one or more relevant neighboring cells.

Figure 8:
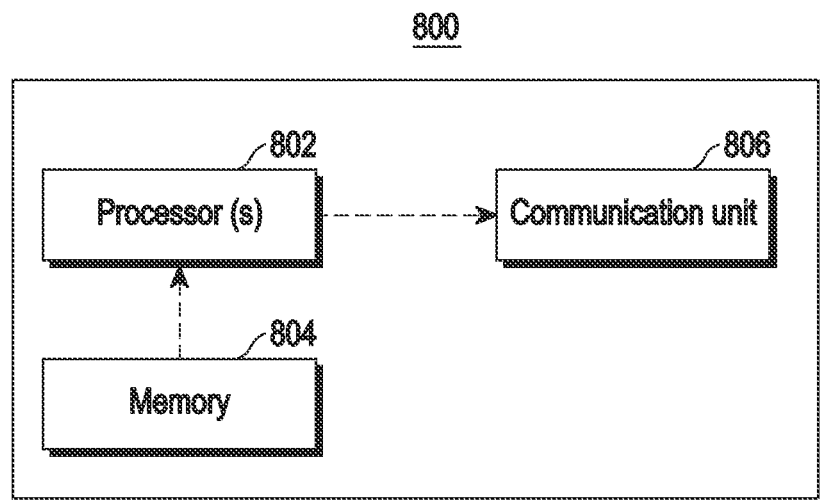
FIG. 8 illustrates diagram of a network node, according to an embodiment of the disclosure.

FIG. 8 illustrates diagram of a network entity 800 according to an embodiment of the disclosure.

Referring to FIG. 8, the network entity may be in communication with the UE, such as, for sending system information blocks, measurement values, and other related information during reselection procedures. The network entity 800 may be associated with a LTE, NR SA, or NSA network. The network entity 800 may include at least one processor 802, a memory 804 (e.g., storage), and a communication unit 806 (e.g., communicator or communication interface). The communication unit 806 may perform one or more functions for transmitting and receiving signals via a wireless channel.

The processor 802 may be a single processing unit or a number of units, all of which could include multiple computing units. The processor 802 may be implemented as one or more microprocessors, microcomputers, microcontrollers, digital signal processors, central processing units, state machines, logic circuitries, and/or any devices that manipulate signals based on operational instructions. Among other capabilities, the processor 802 is configured to fetch and execute computer-readable instructions and data stored in the memory. The processor 802 may include one or a plurality of processors. One or a plurality of processors 802 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 802 may control the processing of the input data in accordance with a predefined operating rule or artificial intelligence (AI) model stored in the non-volatile memory and the volatile memory, i.e., memory 804. The predefined operating rule or artificial intelligence model is provided through training or learning.

The memory 804 may include, but is not limited to, a non-transitory computer-readable storage media, such as, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The memory 804 may include a cache or random-access memory for the processor 802. The memory 804 may include one or more modules comprising a set of instructions that may be executed to cause the network entity 800 to perform any one or more of the methods/processes disclosed herein. The one or more modules may be configured to perform the steps of the disclosure. In an embodiment, each of the one or more modules may be a hardware unit which may be outside the memory 804. Hereinafter, it is understood that terms including "module" may correspond to a unit for processing performing at least one function or operation or method steps as discussed throughout the disclosure. Further, the "module" may be implemented in hardware, software, or a combination of hardware and software.

The memory 804 may be communicatively coupled to the at least one processor (or a controller) 802. The memory 804 may be configured to store data, instructions executable by the at least one processor 802. The memory 804 may communicate via a bus within the network entity 800. The functions, acts or tasks illustrated in the figures or described may be performed by the programmed processor 802 for executing the instructions stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

FIG. 9 illustrates diagram of the configuration of a user equipment (UE), according to an embodiment of the disclosure.

Referring to FIG. 9, the UE may be configured to perform, or may comprise a system to perform, the functionalities and methods related to the UE as detailed with respect to FIGS. 2, 3A, 3B, 4, 5, 6A, 6B, and 7 above.

Referring to FIG. 9, the UE 900 may include at least one processor 902, a communication unit 906 (e.g., communicator or communication interface), and a memory 904 (e.g., storage). By way of example, the UE 900 may be a User Equipment, such as a cellular phone or other device that communicates over a plurality of cellular networks (such as a third generation (3G), 4G, a 5G or pre-5G, sixth generation (6G) network or any future wireless communication network). The communication unit 906 may perform functions for transmitting and receiving signals via a wireless channel.

The processor 902 may be a single processing unit or a number of units, all of which could include multiple computing units. The processor 902 may be implemented as one or more microprocessors, microcomputers, microcontrollers, digital signal processors, central processing units, state machines, logic circuitries, and/or any devices that manipulate signals based on operational instructions. Among other capabilities, the processor 902 is configured to fetch and execute computer-readable instructions and data stored in the memory. The processor 902 may include one or a plurality of processors. One or a plurality of processors 902 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 902 may control the processing of the input data in accordance with a predefined operating rule or artificial intelligence (AI) model stored in the non-volatile memory and the volatile memory, i.e., memory 904. The predefined operating rule or artificial intelligence model is provided through training or learning.

The memory 904 may include, but is not limited to, a non-transitory computer-readable storage media, such as, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The memory 904 may include a cache or random-access memory for the processor 902. The memory 904 may include one or more modules comprising a set of instructions that may be executed to cause the UE 900 to perform any one or more of the methods/processes disclosed herein. The one or more modules may be configured to perform the steps of the disclosure, as discussed herein. Each of the one or more modules may be a hardware unit which may be outside the memory 904. Hereinafter, it is understood that terms including "module" may correspond to a unit for processing performing at least one function or operation or method steps as discussed throughout the disclosure. Further, the "module" may be implemented in hardware, software, or a combination of hardware and software.

The memory 904 may be communicatively coupled to the at least one processor (or a controller) 902. The memory 904 may be configured to store data, instructions executable by the at least one processor 902. In one embodiment, the memory 904 may communicate via a bus within the UE 900. The functions, acts or tasks illustrated in the figures or described may be performed by the programmed processor 902 for executing the instructions stored in the memory 904. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the solutions proposed herein may be used in any order and in any combination. Unless otherwise defined, all technical and scientific terms used herein have the same meaning as commonly understood by one of ordinary skilled in the art to which this disclosure belongs. The system, methods, and examples provided herein are illustrative only and not intended to be limiting.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing cell reselection performed by a user equipment (UE), the method comprising:
    storing, at the UE, a set of allowed frequency bands supported by a first operator, wherein the set of allowed frequency bands are determined based on a first set of frequency bands supported by the first operator, and a second set of frequency bands supported by a second operator different from the first operator, wherein the second set of frequency bands associated with the second operator is permitted for use by the first operator based on a sharing agreement with the second operator, wherein a plurality of neighboring cells are associated with overlapping frequency bands that are supported by both the first operator and the second operator, and wherein the overlapping frequency bands form part of the first set of frequency bands and the second set of frequency bands;
    decoding a first system information block (SIB) from each of the plurality of neighboring cells, the first SIB comprising frequency information and frequency band information associated with a corresponding neighboring cell;
    determining one or more relevant neighboring cells from the plurality of neighboring cells based on a corresponding first SIB and the stored set of allowed frequency bands based on the sharing agreement;
    determining, based on cell measurements associated with the one or more relevant neighboring cells, at least one neighboring cell for reselection; and
    reselecting to the at least one neighboring cell.

2. The method as claimed in claim 1, wherein the determining of the one or more relevant neighboring cells comprises selecting one or more cells from the plurality of neighboring cells that support one or more of frequency bands from the set of allowed frequency bands.

3. The method as claimed in claim 1, wherein the determining of the one or more relevant neighboring cells comprises:
    selecting one or more neighboring cells from the plurality of neighboring cells, and for each selected neighboring cell:
        determining whether the selected neighboring cell is associated with the overlapping frequency band based on the corresponding first SIB,
        in response to determining that the selected neighboring cell is associated with the overlapping frequency band, decoding a second SIB from the selected neighboring cell,
        determining an operator identifier associated with the selected neighboring cell based on the second SIB, and
        associating the selected neighboring cell with the first operator or the second operator based on the determined operator identifier.

4. The method as claimed in claim 1, wherein the determining of the one or more relevant neighboring cells comprises:
    selecting a neighboring cell from the plurality of neighboring cells, and for each selected neighboring cell:
        determining whether the selected neighboring cell is associated with the overlapping frequency band based on the corresponding first SIB, and
        in response to determining that the selected neighboring cell is associated with the overlapping frequency band, determining whether an operator identifier associated with the selected neighboring cell is stored in a database; and
    upon determining that the operator identifier associated with the selected neighboring cell is stored in a database:
        retrieving the operator identifier from the database, and
        associating the selected neighboring cell with the first operator or the second operator based on the determined operator identifier.

5. The method as claimed in claim 4, further comprising:
    upon determining that the operator identifier associated with the selected neighboring cell is not stored in a database:
        decoding a second SIB from the selected neighboring cell,
        determining an operator identifier associated with the selected neighboring cell based on the second SIB,
        associating the selected neighboring cell with the first operator or the second operator based on the determined operator identifier, and
        storing the operator identifier in the database.

6. The method as claimed in claim 4, wherein the operator identifier is a public land mobile network (PLMN) identifier.

7. A method for managing cell reselection performed by a user equipment (UE), the method comprising:
    storing, at the UE, a set of allowed public land mobile network (PLMN) identifiers associated with a first operator, wherein the set of allowed PLMN identifiers is pre-determined based on an agreement between the first operator and a second operator;
    identifying a plurality of neighboring cells by decoding a first system information block (SIB) from each of the plurality of neighboring cells; and
    selecting a neighboring cell from the plurality of neighboring cells, and for each selected neighboring cell:
        receiving a second SIB associated with the selected neighboring cell, determining a PLMN identifier associated with the selected neighboring cell based on the second SIB, determining whether the determined PLMN identifier is an allowed PLMN identifier based on the stored set of allowed PLMN identifier, upon determining that the PLMN identifier is an allowed PLMN identifier, determining the selected neighboring cell to be a relevant neighboring cell, and reselecting to the relevant neighboring cell.

8. The method as claimed in claim 7, further comprising:

prior to determining the PLMN identifier, determining whether the selected neighboring cell meets a predefined reselection criteria;

determining the PLMN identifier associated with the neighboring cell upon determining that the selected neighboring cell meets the predefined reselection criteria; and triggering reselection to the relevant neighboring cell.

9. The method as claimed in claim 7, further comprising:

determining whether the relevant neighboring cell meets a predefined reselection criteria; and triggering reselection upon determining that the relevant neighboring cell meets the predefined reselection criteria.

10. A user equipment (UE) for managing cell reselection, the UE comprising:

memory, comprising one or more storage media, storing instructions; and at least one processor communicatively coupled to the memory, wherein the instructions, when executed by the at least one processor individually or collectively, cause the UE to:

store, at the UE, a set of allowed frequency bands supported by a first operator; wherein the set of allowed frequency bands are determined based on a first set of frequency bands supported by the first operator, and a second set of frequency bands supported by a second operator different from the first operator, wherein the second set of frequency bands associated with the second operator is permitted for use by the first operator based on a sharing agreement with the second operator, wherein a plurality of neighboring cells are associated with overlapping frequency bands that are supported by both the first operator and the second operator, and wherein the overlapping frequency bands form part of the first set of frequency bands and the second set of frequency bands, decode a first system information block (SIB) from each of the plurality of neighboring cells, the first SIB comprising frequency information and frequency band information associated with a corresponding neighboring cell, determine one or more relevant neighboring cells from the plurality of neighboring cells based on a corresponding first SIB and the stored set of allowed frequency bands based on the sharing agreement, determine, based on cell measurements associated with the one or more relevant neighboring cells, at least one neighboring cell for reselection, and reselect to the at least one neighboring cell.

11. The UE as claimed in claim 10, wherein to determine the one or more relevant neighboring cells, the instructions, when executed by the at least one processor individually or collectively, further cause the UE to:

select one or more cells from the plurality of neighboring cells that support one or more of frequency bands from the set of allowed frequency bands.

12. The UE as claimed in claim 10, wherein to determine the one or more relevant neighboring cells, the instructions, when executed by the at least one processor individually or collectively, further cause the UE to:

select one or more neighboring cells from the plurality of neighboring cells, and for each selected neighboring cell:

determine whether the selected neighboring cell is associated with the overlapping frequency band based on the corresponding first SIB, in response to determining that the selected neighboring cell is associated with the overlapping frequency band, decode a second SIB from the selected neighboring cell, determine an operator identifier associated with the selected neighboring cell based on the second SIB, and associate the selected neighboring cell with the first operator or the second operator based on the determined operator identifier.

13. The UE as claimed in claim 10, wherein to determine the one or more relevant neighboring cells, the instructions, when executed by the at least one processor individually or collectively, further cause the UE to:

select a neighboring cell from the plurality of neighboring cells, and for each selected neighboring cell:

determine whether the selected neighboring cell is associated with the overlapping frequency band based on the corresponding first SIB, and in response to determining that the selected neighboring cell is associated with the overlapping frequency band, determine whether an operator identifier associated with the selected neighboring cell is stored in a database; and upon determining that the operator identifier associated with the selected neighboring cell is stored in a database:

retrieve the operator identifier from the database, and associate the selected neighboring cell with the first operator or the second operator based on the determined operator identifier.

14. The UE as claimed in claim 13, wherein the instructions, when executed by the at least one processor individually or collectively, further cause the UE to:

upon determining that the operator identifier associated with the selected neighboring cell is not stored in a database:

decode a second SIB from the selected neighboring cell, determine an operator identifier associated with the selected neighboring cell based on the second SIB, associate the selected neighboring cell with the first operator or the second operator based on the determined operator identifier, and store the operator identifier in the database.

15. The UE as claimed in claim 13, wherein the operator identifier is a public land mobile network (PLMN) identifier.

* * * * *